UNITED STATES PATENT OFFICE.

HUGO GALLINOWSKY, OF CINCINNATI, OHIO.

WEATHERPROOF COMPOSITION.

933,171.	Specification of Letters Patent.	Patented Sept. 7, 1909.

No Drawing.	Application filed June 26, 1908. Serial No. 440,550.

*To all whom it may concern:*

Be it known that I, HUGO GALLINOWSKY, a resident of Cincinnati, in the State of Ohio, have invented a new and useful Improvement in Weatherproof Composition, of which the following is a specification.

This invention relates to plastic compositions, and more especially to such compositions for producing artificial stone, such as marble and other stone of the better quality which is usually used for interior work and given a high finish or polish.

The object of this invention is to provide a plastic composition, which can be molded or laid down in any size or applied as a coating, and which when set, very closely resembles polished marble and which is weather proof and enduring.

It is well known that if magnesite is calcined and reduced to powdered form, resulting in magnesium oxid, and treated with magnesium chlorid it forms a cement of very satisfactory quality. Artificial stone formed from such composition is very satisfactory when new, but it does not have the necessary enduring or lasting quality, and furthermore, is somewhat objectionable as the surface thereof is constantly damp. I have discovered that this is due to the fact that the ingredients are united only partially, leaving a certain amount of free magnesium oxid and free magnesium chlorid in the cement product, and that both of these act detrimentally in time. The magnesium oxid carbonizes and expands, so injuring the bond of the composition and causing it to disintegrate while the chlorid in time appears on the surface and keeps the latter constantly damp, due to its affinity for moisture. In my improved composition I overcome these faults and bring the cement up to its maximum usefulness and endurance by adding suitable ingredients which combine with the free magnesium oxid and neutralize the alkaline matter, that is, the free magnesium chlorid. As an ingredient for combining with the free magnesium oxid I prefer to use silica in some fine form, such as mineral wool, and especially such as prepared by superheating granite and forming it into a fine silica fiber which becomes pliable if moistened with an alkaline solution and which is principally silica in a fine fibrous form, and crushed or hammered until reduced very fine. This is mixed with the magnesium oxid in a proportion suitable for the intended work, after which I add a suitable neutralizer for the free alkali, preferably in the form of barium sulfate or barite, either artificially prepared and known under the name of permanent white or the well known mineral barite. The barium sulfate is added in such proportions as to neutralize all of the free magnesium chlorid. This mixture is then rendered plastic by adding to it magnesium chlorid in solution and at a density of about 30 degrees. In this plastic form the mixture can be molded or laid on with a trowel or the like in any desired shape, size, or thickness of layer. When it hardens it very closely resembles polished marble and has all of the enduring qualities of the latter. The fine particles of silica, that is, mineral wool, in time combine with any magnesium oxid which is left free in the first hardening of the substance, while the sulfate of barium neutralizes all particles of alkaline matter, that is, any free magnesium chlorid. The consequence is that there is no danger of carbonization of the magnesium oxid, and no detrimental expansion and disintegration referred to, and furthermore the absence of any free alkaline matter does away with the objectionable dampness on the surface.

The several ingredients named may be mixed in various proportions depending upon the character of work. The following proportions have been found satisfactory, the ingredients being measured and not weighed: magnesium oxid 2 parts, crushed mineral wool 2 parts, sulfate of barium 1 part, magnesium chlorid 3 parts. The proportion of the solution of magnesium chlorid added will vary according to the degree of plasticity to be given to the mixture and the sulfate of barium may bear a certain relation to the magnesium chlorid, that is, if more of the solution is used it calls for a larger quantity of the sulfate of barium, and vice versa. The proportion of silica and barium sulfate added may be increased considerably above those stated as an excess of either will do no harm, since those parts not entering into chemical combination will merely act as a dead filler.

This composition may have added to it coloring matter if desired and may also have added thereto other ingredients to form artificial stone of different colors and appearances.

What I claim is:

1. The herein described weather-proof composition for artificial stone and the like, consisting of magnesium oxid, magnesium chlorid, pulverized silica in sufficient quantity to combine with all free magnesium oxid, and a substance to neutralize all free magnesium chlorid.

2. The herein described weather-proof composition for artificial stone and the like, consisting of magnesium oxid, magnesium chlorid, material which combines with the free magnesium oxid, and sulfate of barium in sufficient quantity to neutralize all free magnesium chlorid.

3. The herein described weather proof composition for artificial stone and the like, consisting of magnesium oxid, magnesium chlorid, powdered silica in sufficient quantity to combine with all free magnesium oxid, and sulfate of barium in sufficient quantity to neutralize all free magnesium chlorid.

4. The herein described weather-proof composition for artificial stone and the like, consisting of magnesium oxid, magnesium chlorid, powdered silica, and barium sulfate, the barium sulfate being in excess of four per cent. of the mixture.

5. A basic oxychlorid cement including magnesium oxid, magnesium chlorid, and ingredients which combine and neutralize the free ingredients of the cement and which are inert as to the excess portions thereof.

6. A basic oxychlorid cement including magnesium oxid and magnesium chlorid, and crushed mineral wool and sulfate of barium to bind the magnesium chlorid and neutralize the remaining free portions of said ingredients.

In testimony whereof, I have hereunto set my hand.

HUGO GALLINOWSKY.

Witnesses:
G. BIANCHI,
J. A. GREATHOUSE.